United States Patent
Hutchins

(10) Patent No.: US 9,324,364 B2
(45) Date of Patent: Apr. 26, 2016

(54) CONSTRAINING FIR FILTER TAPS IN AN ADAPTIVE ARCHITECTURE

(71) Applicant: International Business Machines Corporation, Armonk, NY (US)

(72) Inventor: Robert A. Hutchins, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/334,440

(22) Filed: Jul. 17, 2014

(65) Prior Publication Data

US 2016/0019929 A1   Jan. 21, 2016

(51) Int. Cl.
*G11B 5/09* (2006.01)
*G11B 20/10* (2006.01)

(52) U.S. Cl.
CPC .............................. *G11B 20/10046* (2013.01)

(58) Field of Classification Search
None
See application file for complete search history.

(56) References Cited

U.S. PATENT DOCUMENTS

| | | | |
|---|---|---|---|
| 3,764,914 A * | 10/1973 | Karnaugh | 375/232 |
| 5,548,642 A * | 8/1996 | Diethorn | 379/406.14 |
| 5,596,605 A | 1/1997 | Kiyanagi et al. | |
| 6,052,404 A | 4/2000 | Tiepermann | |
| 6,167,415 A | 12/2000 | Fischer et al. | |
| 6,175,849 B1 | 1/2001 | Smith | |
| 6,208,481 B1 | 3/2001 | Spurbeck et al. | |
| 6,636,562 B1 | 10/2003 | Galbraith et al. | |
| 6,650,756 B1 * | 11/2003 | Saito et al. | 381/71.12 |
| 6,721,368 B1 | 4/2004 | Younis et al. | |
| 6,804,695 B1 | 10/2004 | Hsu | |
| 7,271,971 B2 | 9/2007 | Hutchins et al. | |
| 7,359,135 B2 | 4/2008 | Hutchins et al. | |
| 7,424,053 B2 * | 9/2008 | Murray et al. | 375/229 |
| 7,436,615 B2 | 10/2008 | Eleftheriou et al. | |
| 7,589,927 B2 | 9/2009 | Hutchins et al. | |
| 7,596,176 B2 | 9/2009 | Eleftheriou et al. | |
| 7,821,733 B2 | 10/2010 | Eleftheriou et al. | |
| 8,164,846 B1 | 4/2012 | Yang et al. | |
| 8,548,072 B1 * | 10/2013 | Eliaz | 375/259 |

(Continued)

FOREIGN PATENT DOCUMENTS

| | | |
|---|---|---|
| EP | 0805447 | 11/1997 |
| EP | 1560329 | 8/2005 |

(Continued)

OTHER PUBLICATIONS

Du et al., "A Linearly Constrained Adaptive FIR Filter for Hard Disk Drive Read Channels," 1997 IEEE, pp. 1613-1617.

(Continued)

*Primary Examiner* — Peter Vincent Agustin
(74) *Attorney, Agent, or Firm* — Zilka-Kotab, PC

(57) ABSTRACT

According to one embodiment, a system for processing data includes a processor and logic integrated with and/or executable by the processor, the logic being configured to individually set, for each of one or more range-constrained finite impulse response (FIR) filter taps configured for use in a FIR filter, a predetermined range of values suitable for controlling an equalizer response, and pass data through the equalizer including the FIR filter to obtain equalized data, wherein each of the one or more range-constrained FIR filter taps are individually adaptive within its predetermined range of values. Other systems and methods for processing data by constraining FIR filter taps while reading data from a data storage medium are described in more embodiments.

19 Claims, 8 Drawing Sheets

(56) References Cited

U.S. PATENT DOCUMENTS

| | | | |
|---|---|---|---|
| 8,605,380 | B1 | 12/2013 | Christensen et al. |
| 8,625,226 | B2 | 1/2014 | Christensen et al. |
| 8,665,941 | B1* | 3/2014 | Eliaz .......................... 375/233 |
| 8,947,821 | B1* | 2/2015 | Blinick et al. ................. 360/65 |
| 9,236,084 | B1 | 1/2016 | Blinick et al. |
| 2002/0141105 | A1 | 10/2002 | Ellis |
| 2003/0099289 | A1* | 5/2003 | Birru .......................... 375/233 |
| 2003/0219085 | A1 | 11/2003 | Endres et al. |
| 2004/0105514 | A1* | 6/2004 | Howarth et al. ............ 375/345 |
| 2004/0165303 | A1* | 8/2004 | Wu ................... G11B 20/10046 360/65 |
| 2005/0163251 | A1* | 7/2005 | McCallister ................. 375/296 |
| 2005/0261898 | A1* | 11/2005 | Van Klinken ................. 704/219 |
| 2005/0281231 | A1 | 12/2005 | Kwon et al. |
| 2006/0082915 | A1* | 4/2006 | Eleftheriou et al. ............ 360/55 |
| 2008/0112289 | A1* | 5/2008 | Nishimura et al. ......... 369/53.3 |
| 2009/0063940 | A1 | 3/2009 | Yen et al. |
| 2010/0176865 | A1 | 7/2010 | Dahle et al. |
| 2010/0177419 | A1 | 7/2010 | Liu et al. |
| 2010/0189207 | A1 | 7/2010 | Jibry |
| 2010/0220780 | A1 | 9/2010 | Peng et al. |
| 2011/0298890 | A1 | 12/2011 | Bacche |
| 2013/0051211 | A1* | 2/2013 | Bailey et al. .................. 369/174 |
| 2013/0097213 | A1 | 4/2013 | Liao et al. |
| 2013/0259111 | A1 | 10/2013 | Harman |
| 2014/0092952 | A1 | 4/2014 | Aguilar-Arreola et al. |
| 2014/0105268 | A1 | 4/2014 | Eliaz |
| 2014/0212132 | A1* | 7/2014 | Saito et al. ..................... 398/25 |
| 2014/0241477 | A1* | 8/2014 | Eliaz .......................... 375/348 |
| 2016/0019930 | A1 | 1/2016 | Blinick et al. |

FOREIGN PATENT DOCUMENTS

| | | |
|---|---|---|
| EP | 002075924 | 7/2007 |
| FR | 2799085 | 3/2001 |
| JP | S59141842 A | 8/1984 |
| JP | 2001044830 A | 2/2001 |
| WO | WO03034673 | 4/2003 |
| WO | WO2005033904 | 4/2005 |
| WO | WO2006116723 | 11/2006 |

OTHER PUBLICATIONS

Saha et al., "Adaptive Particle Swarm Optimization for Low Pass Finite Impulse Response Filter Design," International Conference on Communication and Signal Processing, Apr. 3-5, 2013, pp. 19-23.

Sobey et al., "LMS Filter Adaptation in PRML Channels," ChannelScience.com, pp. 1-8.

Xie et al., "Implementation-Friendly Constraint for Adaptive Finite Impulse Response Filters for Equalization," IEEE Transactions on Magnetics, vol. 44, No. 2, Feb. 2008, pp. 315-319.

Eleftheriou et al., "Adaptive noise-predictive maximum-likelihood (NPML) data detection for magnetic tape storage systems," IBM J. Res. & Dev., vol. 54, No. 2, Paper 7, Mar./Apr. 2010, pp. 1-10.

Supplemental Notice of Allowance from U.S. Appl. No. 14/334,474, dated Nov. 25, 2015.

Blinick et al., U.S. Appl. No. 14/957,533, filed Dec. 2, 2015.

Blinick et al., U.S. Appl. No. 14/957,540, filed Dec. 2, 2015.

Notice of Allowance from U.S. Appl. No. 14/334,474, dated May 11, 2015.

Blinick et al., U.S. Appl. No. 14/334,474, filed Jul. 17, 2014.

Notice of Allowance from U.S. Appl. No. 14/334,474, dated Sep. 2, 2015.

Statement of Relevance of Non-Translated Foreign Document JP2001044830A.

Statement of Relevance of Non-Translated Foreign Document JPS59141842.

Non-Final Office Action from U.S. Appl. No. 14/957,540, dated Feb. 1, 2016.

* cited by examiner

US 9,324,364 B2

CONSTRAINING FIR FILTER TAPS IN AN ADAPTIVE ARCHITECTURE

BACKGROUND

The present invention relates to data storage, and more particularly, to constraining finite impulse response (FIR) filter taps while reading data from a data storage medium.

In magnetic data storage, and particularly when storing data to and retrieving data from magnetic tape, a given tape drive, in order to be most useful, should be able to read as many different types of magnetic tapes as possible, from multiple vendors and having different layouts. The magnetic tapes that are read may be manufactured by any of several different manufacturers. Furthermore, legacy magnetic tapes having outdated formats and layouts should also be able to be read by the tape drive. Because of this, the read-detection channel of the tape drive should be able to adapt to variations in readback signals that it might receive, across a family of magnetic tapes having different manufacturers and/or layouts.

Thus, it is desirable that the read-detection channel has the ability to adapt to a wide range of signals while ensuring that the adaptation is controlled and optimal.

BRIEF SUMMARY

According to one embodiment, a system for processing data includes a processor and logic integrated with and/or executable by the processor, the logic being configured to individually set, for each of one or more range-constrained finite impulse response (FIR) filter taps configured for use in a FIR filter, a predetermined range of values suitable for controlling an equalizer response, and pass data through the equalizer including the FIR filter to obtain equalized data, wherein each of the one or more range-constrained FIR filter taps are individually adaptive within its predetermined range of values.

In another embodiment, a method for processing data in a read channel includes individually setting, for each of one or more range-constrained FIR filter taps configured for use in a FIR filter, a predetermined range of values suitable for controlling an equalizer response, and passing data through the equalizer including the FIR filter to obtain equalized data, wherein each of the one or more range-constrained FIR filter taps are individually adaptive within its predetermined range of values, and the data is read from a magnetic storage medium.

According to another embodiment, a magnetic tape drive includes a processor and logic integrated with and/or executable by the processor, the logic being configured to receive data from an analog-to-digital converter (ADC) in a read channel, individually determine, for each of one or more range-constrained FIR filter taps configured for use in a FIR filter of the read channel, a predetermined range of values suitable for controlling an equalizer response, individually set, for each of the one or more range-constrained FIR filter taps, a predetermined range of values suitable for controlling the equalizer response, wherein each of the one or more range-constrained FIR filter taps are individually adaptive within its predetermined range of values based on current operating conditions, individually select, for each of the one or more range-constrained FIR filter taps, a value within its predetermined range prior to passing the data through the equalizer, wherein the value is selected to optimally control the equalizer response based on current operating conditions and in relation to any other range-constrained FIR filter taps, individually determine, for each of one or more fixed FIR filter taps, a static value which does not change, wherein the static value is determined to optimally control the equalizer response based on results obtained from an initial equalizer, and set each of the one or more fixed FIR filter taps to its static value prior to passing the data through the equalizer, and pass the data through the equalizer including the FIR filter to obtain equalized data, wherein the FIR filter includes from 9 to 35 FIR filter taps, from 1 to 13 range-constrained FIR filter taps, and from 1 to 13 fixed FIR filter taps.

Other aspects and embodiments of the present invention will become apparent from the following detailed description, which, when taken in conjunction with the drawings, illustrates by way of example the principles of the invention.

DETAILED DESCRIPTION

Figure 1A:
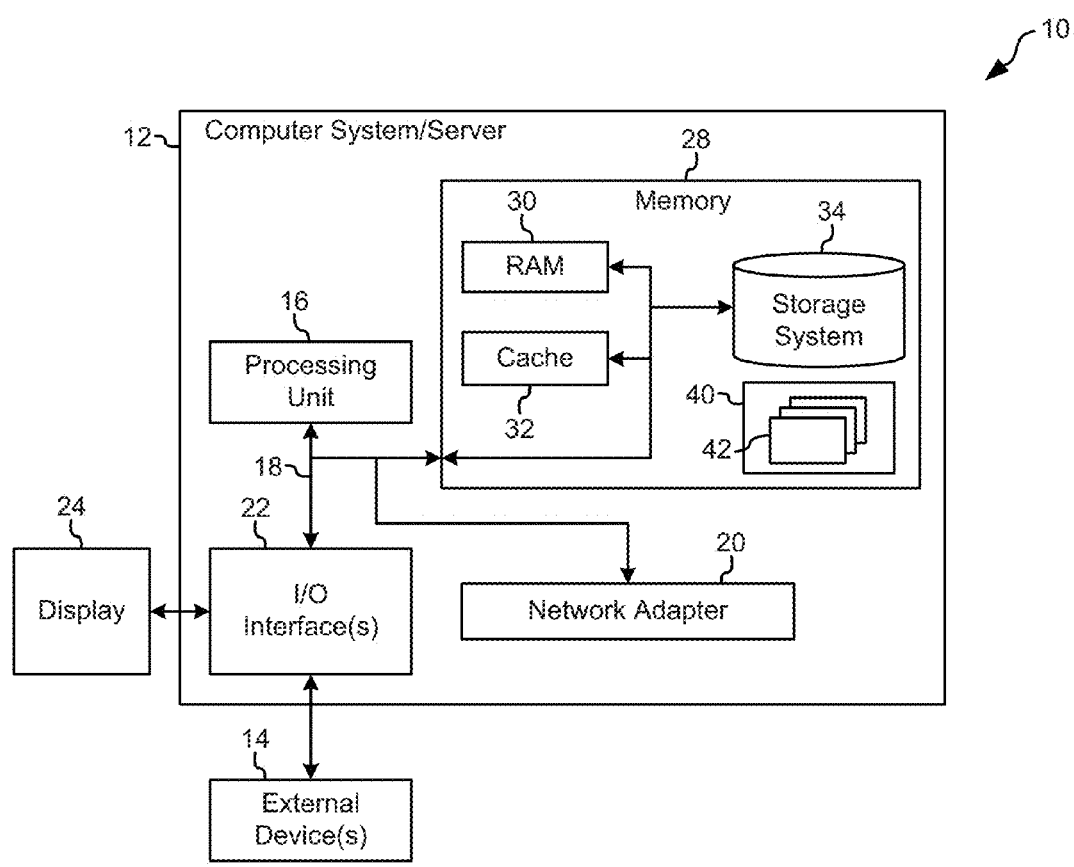
FIG. 1A illustrates a network storage system, according to one embodiment.

The following description is made for the purpose: of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an," and "the" include plural referents unless otherwise specified.

According to one general embodiment, a system for processing data includes a processor and logic integrated with and/or executable by the processor, the logic being configured to individually set, for each of one or more range-constrained finite impulse response (FIR) filter taps configured for use in a FIR filter, a predetermined range of values suitable for controlling an equalizer response, and pass data through the equalizer including the FIR filter to obtain equalized data, wherein each of the one or more range-constrained FIR filter taps are individually adaptive within its predetermined range of values.

In another general embodiment, a method for processing data in a read channel includes individually setting, for each of one or more range-constrained FIR filter taps configured for use in a FIR filter, a predetermined range of values suitable for controlling an equalizer response, and passing data through the equalizer including the FIR filter to obtain equalized data, wherein each of the one or more range-constrained FIR filter taps are individually adaptive within its predetermined range of values, and the data is read from a magnetic storage medium.

According to another general embodiment, a magnetic tape drive includes a processor and logic integrated with and/or executable by the processor, the logic being configured to receive data from an analog-to-digital converter (ADC) in a read channel, individually determine, for each of one or more range-constrained FIR filter taps configured for use in a FIR filter of the read channel, a predetermined range of values suitable for controlling an equalizer response, individually set, for each of the one or more range-constrained FIR filter taps, a predetermined range of values suitable for controlling the equalizer response, wherein each of the one or more range-constrained FIR filter taps are individually adaptive within its predetermined range of values based on current operating conditions, individually select, for each of the one or more range-constrained FIR filter taps, a value within its predetermined range prior to passing the data through the equalizer, wherein the value is selected to optimally control the equalizer response based on current operating conditions and in relation to any other range-constrained FIR filter taps, individually determine, for each of one or more fixed FIR filter taps, a static value which does not change, wherein the static value is determined to optimally control the equalizer response based on results obtained from an initial equalizer, and set each of the one or more fixed FIR filter taps to its static value prior to passing the data through the equalizer, and pass the data through the equalizer including the FIR filter to obtain equalized data, wherein the FIR filter includes from 9 to 35 FIR filter taps, from 1 to 13 range-constrained FIR filter taps, and from 1 to 13 fixed FIR filter taps.

Referring now to FIG. 1A, a schematic of a network storage system 10 is shown according to one embodiment. This network storage system 10 is only one example of a suitable storage system and is not intended to suggest any limitation as to the scope of use or functionality of embodiments of the invention described herein. Regardless, network storage system 10 is capable of being implemented and/or performing any of the functionality set forth hereinabove.

In the network storage system 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1A, computer system/server 12 in the network storage system 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 may include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 may be provided for reading from and writing to a non-removable, non-volatile magnetic media—not shown and typically called a "hard disk," which may be operated in a HDD. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each may be connected to bus 18 by one or more data media interfaces. As will be further depicted and described below, memory 28 may include at least one program product having a set (e.g., at least one) of program modules that are configured to carry out the functions of embodiments described herein.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication may occur via Input/Output (I/O) interfaces 22. Still yet, computer system/server 12 may communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 1B:
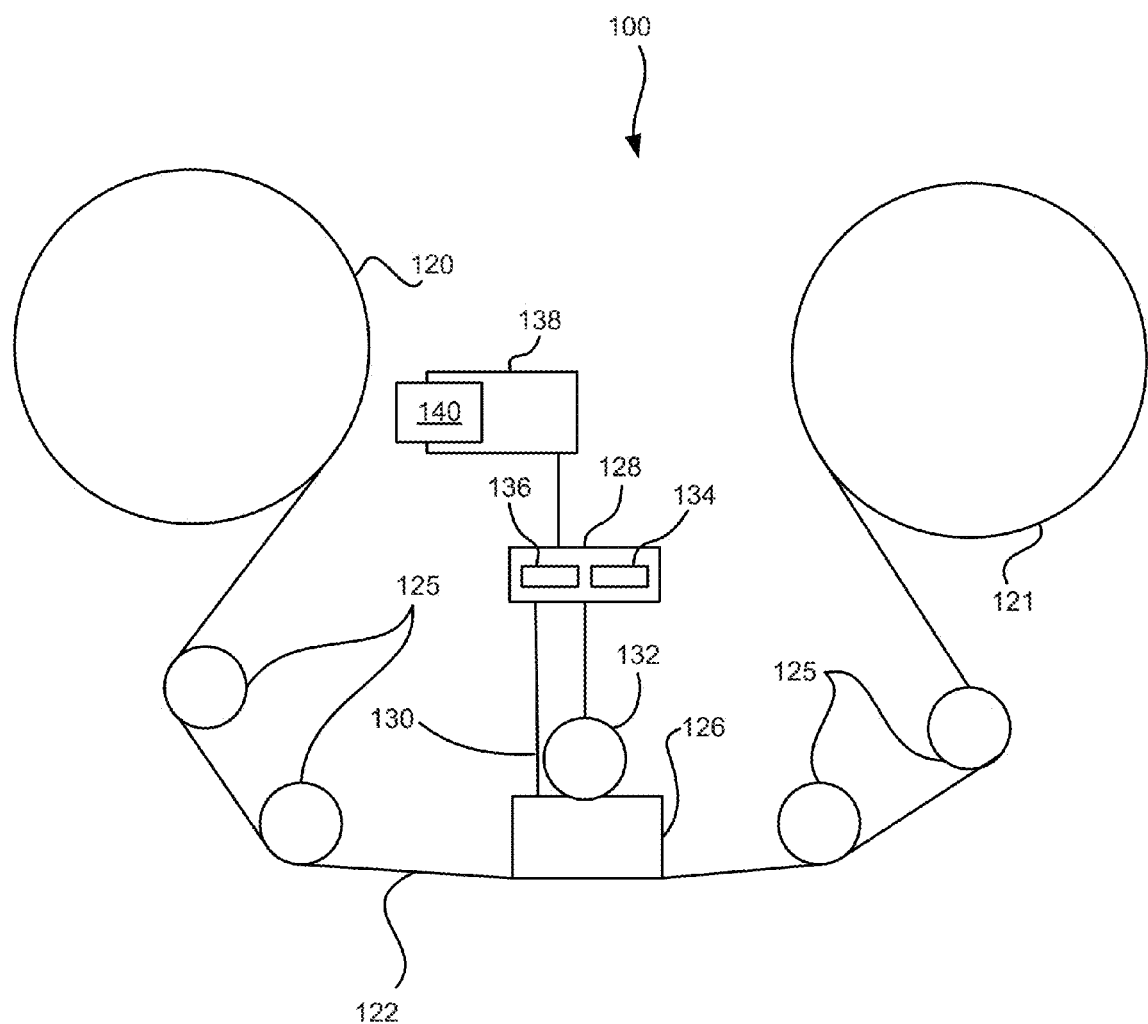
FIG. 1B illustrates a simplified tape drive of a tape-based data storage system, according to one embodiment.

FIG. 1B illustrates a simplified tape drive 100 of a tape-based data storage system, which may be employed according to various embodiments. While one specific implementation of a tape drive is shown in FIG. 1B, it should be noted that the embodiments described herein may be implemented in the context of any type of tape drive system. As shown, a tape supply cartridge 120 and a take-up reel 121 are provided to support a tape 122. One or more of the reels may form part of a removable cassette and are not necessarily part of the tape drive 100. The tape drive 100, such as that illustrated in FIG. 1B, may further include drive motor(s) to drive the tape supply cartridge 120 and the take-up reel 121 to move the tape 122 over a tape head 126 of any type.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 moves the head 126 to a set of tracks on the tape 122 in order to perform a write or a read operation.

In one embodiment, the tape drive 100 may comprise a data buffer 138 which is accessible by the tape drive 100 and the controller 128. This data buffer 138 may be organized as a ring buffer and may be split into one or more portions, with one portion being a reserved data buffer 140, which may also be organized into a ring buffer, to be used for storage of partial data sets during reading operations from the tape 122.

An interface may also be provided for communication between the tape drive 100 and a host (integral or external) to send and receive the data and for controlling the operation of the tape drive 100 and communicating the status of the tape drive 100 to the host, as would be understood by one of skill in the art.

Figure 2:
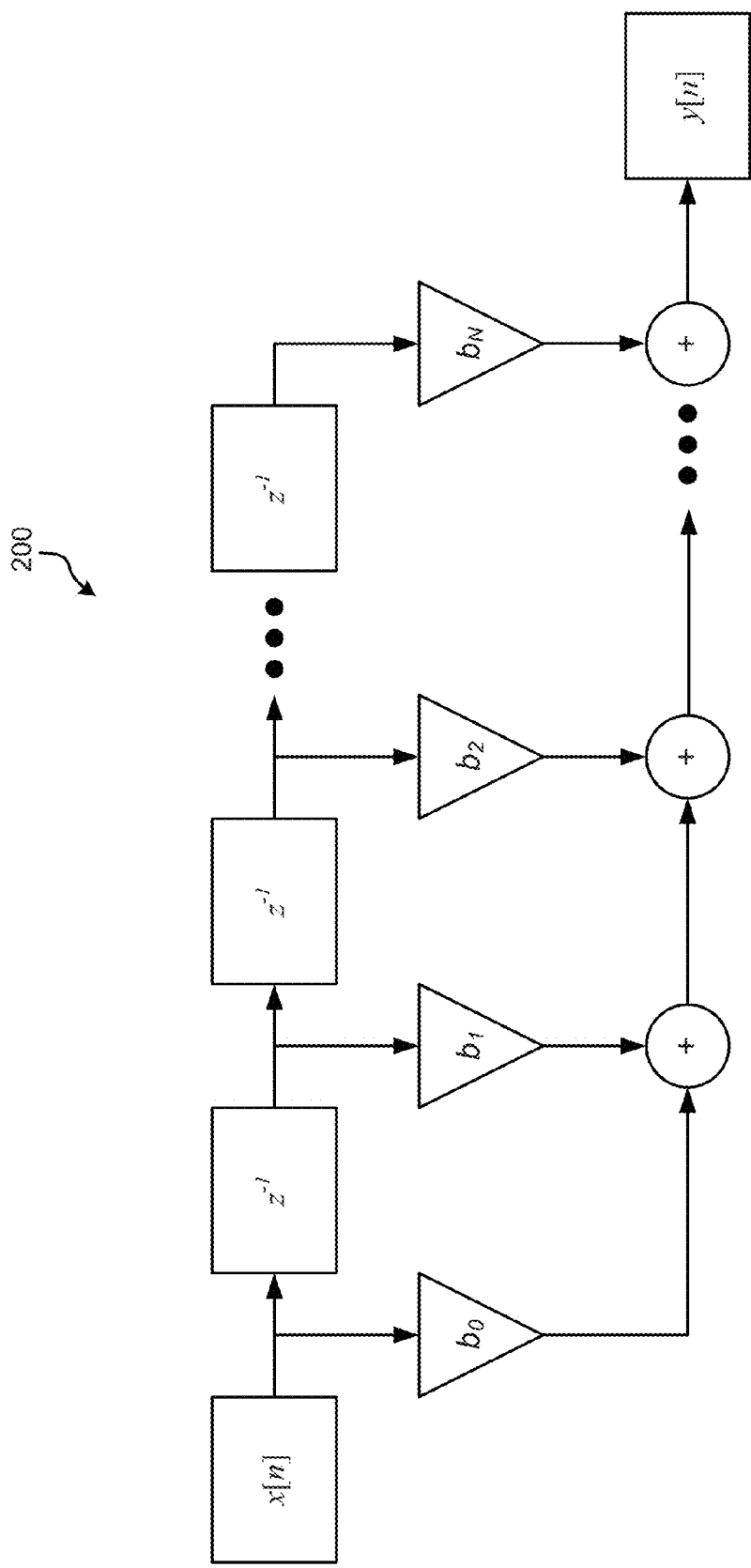
FIG. 2 shows an exemplary discrete-time finite impulse response (FIR) filter, according to one embodiment.

One of the components commonly used in a read-detection channel is a finite impulse response (FIR) filter. An exemplary discrete-time FIR filter 200 of order N is shown in FIG. 2, with each value of the output sequence being a weighted sum of the most recent input values.

According to this exemplary FIR filter design, x[n] is an input signal to the FIR filter, y[n] is an output signal from the FIR filter, N is a filter order with an $N^{th}$-order filter having (N+1) terms, and $b_i$ is a value of the impulse response at the $i^{th}$ instant for 0≤i≤N of an $N^{th}$-order FIR filter. In the context of this exemplary FIR filter, Formula 1 may be used to determine the output of the FIR filter:

$$y[n]=b_0x[n]+b_1x[n-1]+\ldots+b_NN[n-N] \quad \text{Formula 1}$$

In a reduced form, Formula 1 may be represented by Formula 2.

$$y[n] = \sum_{i=0}^{N} b_i \cdot x[n-i] \quad \text{Formula 2}$$

These formulae are referred to as a discrete convolution. The x[n−i] values in these formulae are commonly referred to as taps, based on the structure of a tapped delay line that in many implementations or block diagrams provides the delayed inputs to the multiplication operations.

Typical read-channels of some tape drives routinely statically set the FIR taps with values which have been determined to be appropriate under a given set of operating conditions. However, static FIR taps are not able to adapt to changes in operating conditions of the tape drive, such as from tape degradation over time, differences due to tape manufacturer specifications, etc.

Therefore, in order to allow for more flexibility and adaptability, according to embodiments described herein, a range for one or more FIR taps may be set instead of fixing all the FIR taps to individual static values or allowing all FIR taps to be adaptive, thereby allowing more flexibility and adaptability to changing operating conditions and a wide range of signals while ensuring stability. Specifically, in one embodiment, one or more FIR taps may be constrained within a predetermined range in an adaptive environment, with a predetermined upper limit and a predetermined lower limit being set for each range-constrained FIR tap.

Figure 3:
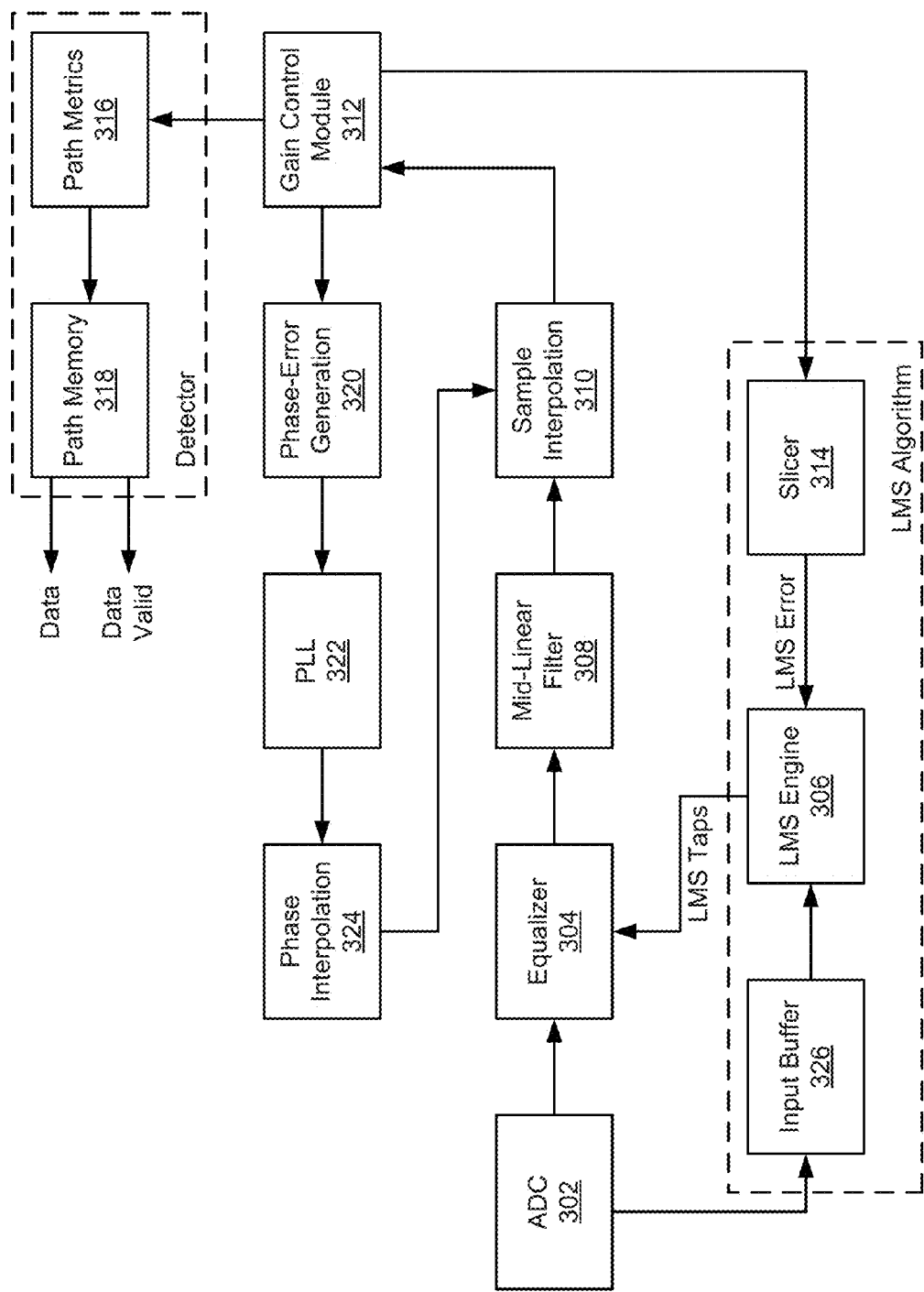
FIG. 3 shows a read-channel architecture, according to one embodiment.

In a read-channel 300 architecture, as shown in FIG. 3, there is an equalizer 304, which may employ a filter such as a FIR filter, that is controlled through an algorithm configured to set the taps that is executed by a tap module 306, such as a least means square (LMS) algorithm executed on an LMS engine. In one embodiment, the equalizer 304 may utilize a FIR filter, and therefore the terms may be used interchangeably. The FIR filter of the equalizer 304 may have any number of taps such as 9 taps, 11 taps, 23 taps, 31 taps, etc., and in this architecture, the FIR filter of the equalizer 304 has 17 taps. However, any number of FIR taps may be used, e.g., ranging from 7 FIR taps up to and including 35 FIR taps.

In this architecture, there is the capability to fix one or more taps, allow one or more taps to freely adjust via the algorithm that is executed by the tap module 306, and/or allow one or more taps to adjust within a predetermined range via the algorithm that is executed by the tap module 306.

When the number of taps that are fixed is small (e.g., 1-5 of the 17 taps) and the remaining taps are allowed to freely adjust, the algorithm that is executed by the tap module 306 may cause the FIR taps to diverge and the read-channel may fail. When the number of taps that are fixed is large (e.g., greater than 11 of the 17 taps) and the remaining taps are allowed to freely adjust, the FIR will be stable but the ability to adapt to changes will be limited.

During a read operation in a magnetic tape drive, analog data is received from the magnetic tape at an input to an analog-to-digital converter (ADC) 302. The ADC 302 outputs a digitized form of this analog data. The digital data is then filtered by the equalizer 304 and then processed by numerous other blocks, such as a mid-linear filter 308, sample interpolation module 310, gain control 312, slicer 314, path metrics 316, path memory 318, phase-error generation module 320, a phase-locked-loop (PLL) module 322, a phase interpolation module 324, among other known components of a read-channel architecture not specifically described herein. In addition, the data input from the ADC 302 may be stored in an input buffer 326 of a type known in the art. For the sake of this description, it may be assumed that each of these other components function and behave in accordance with preconceptions and understandings of those of skill in the relevant art.

Ultimately, the binary sequence that was written on the magnetic tape is decoded and correctly output from the read-channel 300 after passing to the path memory 318.

In this read-channel 300 architecture, an error signal is fed back from a slicer 314 to the tap module 306, such as one or more LMS engines. In an alternative embodiment, an error signal is fed back from a detector in the path metrics 316, such as a maximum-likelihood (ML) detector. The tap module 306 uses this error to adjust the equalizer coefficients, taps, based upon the signals that the detector receives. Thus, as the signal quality of the magnetic tape changes, the equalizer 304 may be adjusted to track those changes to the signal quality in order to provide the best decoded data signal.

Figure 4:
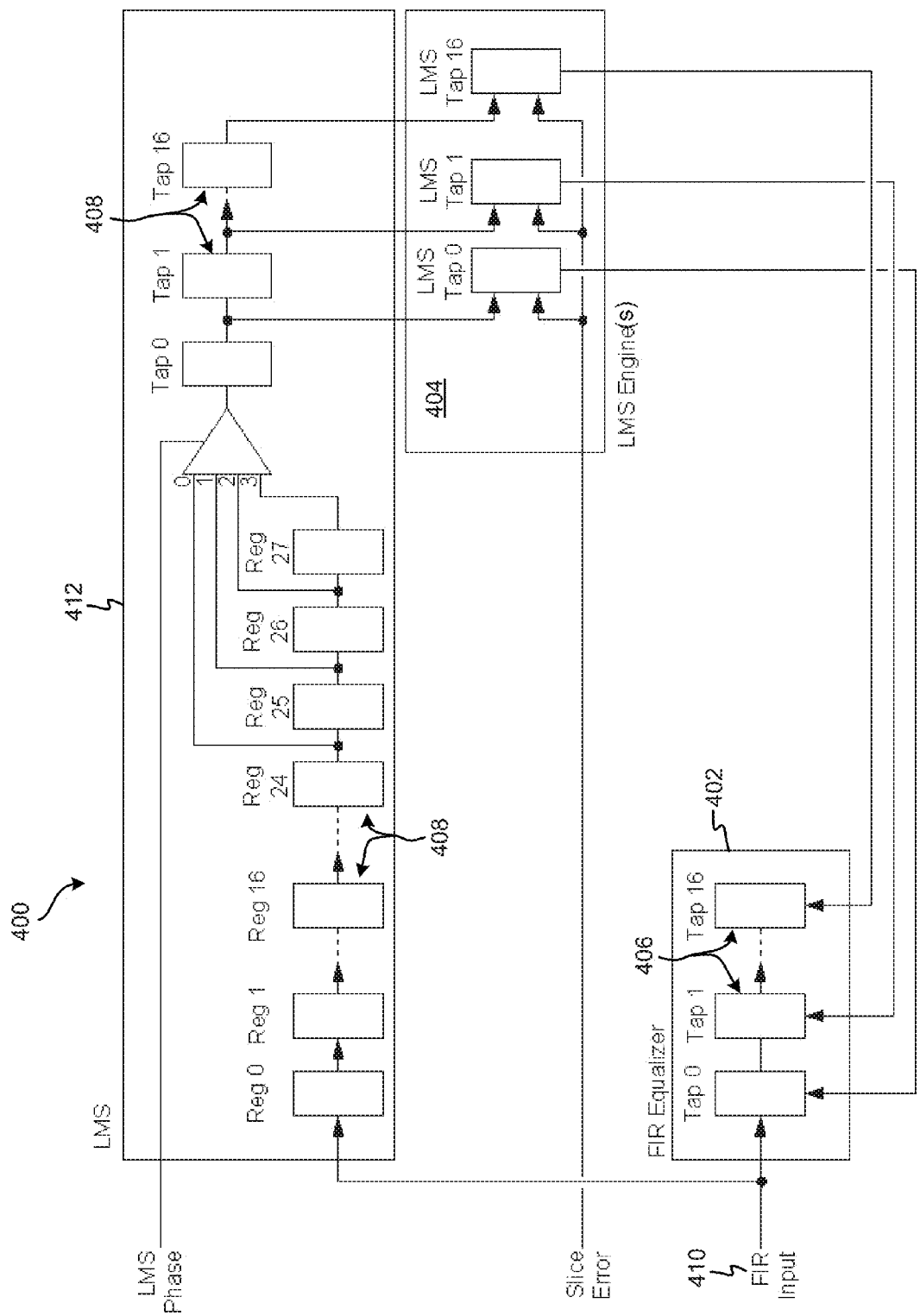
FIG. 4 shows a FIR equalizer and LMS engine(s), according to one embodiment.

A FIR equalizer 402 and LMS engine(s) 404 are shown in FIG. 4 according to one embodiment. As shown, when employing a FIR equalizer 402 which uses a 17-tap LMS engine 404 (or 17 LMS engines each controlling one FIR tap), the 17-tap LMS engine 404 drives and controls 17 FIR taps 406. A plurality of registers 408 may be employed to store values of the FIR input 410 prior to applying the LMS algorithm in the LMS module 412. (In FIG. 4, on the top right are registers 408 labeled Tap 0, Tap 1, and Tap 16. These are buffered data registers like those registers 408 used to store values of the FIR input 410. Tap 0 408 (shown in the upper right of FIG. 4) is buffered data that is aligned with the error signal for Tap 0 406 (shown in the lower left of FIG. 4). Likewise, Tap 1 (shown in the upper right of FIG. 4) is buffered data that is aligned with the error signal for Tap 1 (shown in the lower left of FIG. 4).

Based on experience, when all of the 17 FIR taps 406 are under control of the 17 LMS engines 404, then the system will become unstable and the values of the FIR taps 406 will diverge from optimal settings, to the detriment of the data output. This divergence is so great that the read-channel becomes non-functional.

With current methodologies, the output is stabilized by fixing some of the FIR taps 406. An initial equalizer is designed by the tape drive and loaded into the equalizer 402. Several FIR taps 406 are fixed and not allowed to adapt under the control of the LMS algorithm in the LMS module 412. In many cases, 4-5 FIR taps 406 are fixed in order to keep the system stable.

Figure 5:
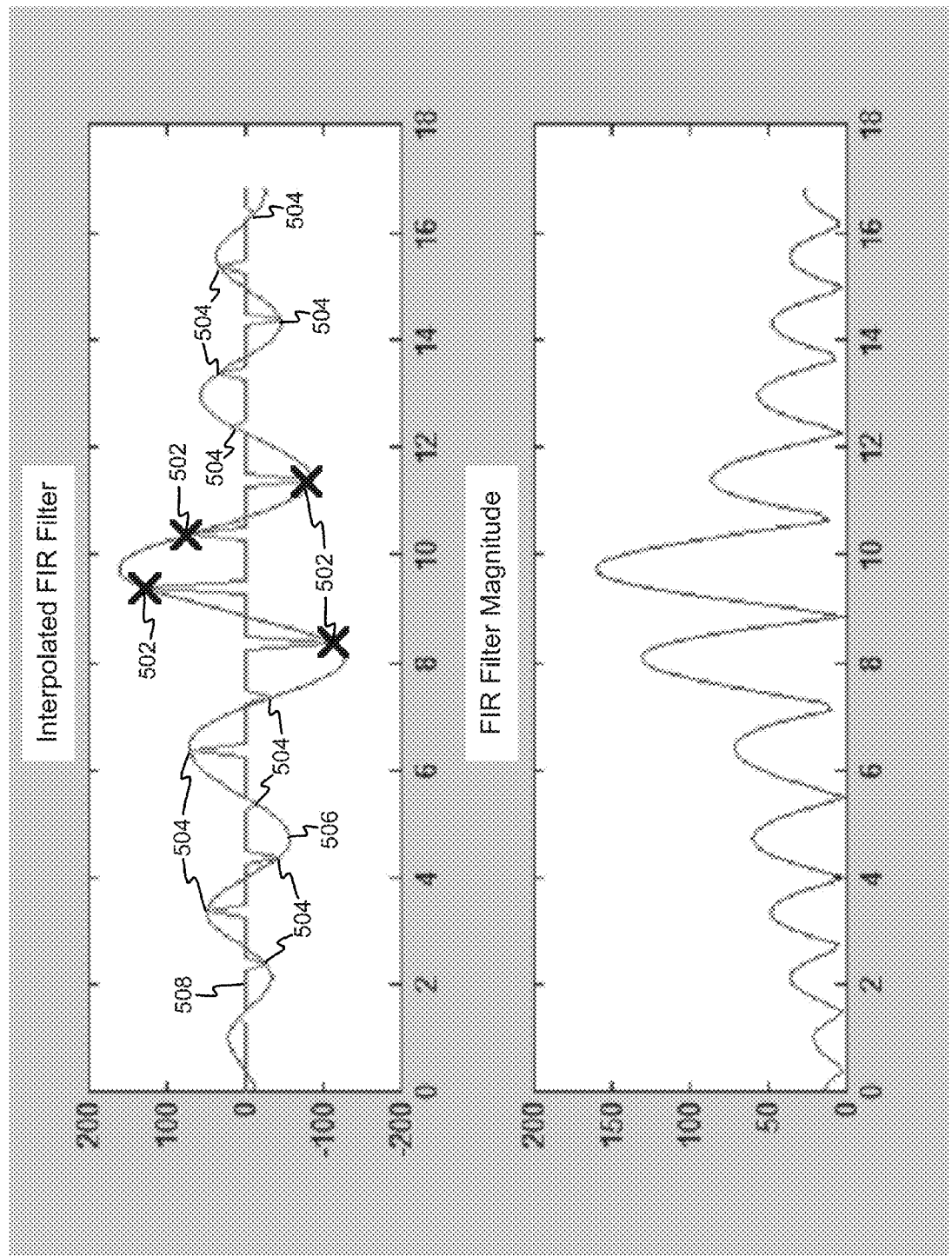
FIG. 5 shows an example of how taps may be fixed, according to another embodiment.

Now referring to FIG. 5, an example of how taps may be fixed is shown according to one example. In the upper chart of FIG. 5, an interpolated FIR filter signal is shown in the upper chart, while a magnitude of the filter signal is shown in the lower chart.

As shown in the interpolated FIR filter signal 508, several fixed taps 502 (taps 8-11 indicated by X's) of a FIR filter are illustrated that are fixed to individual predetermined values along with an interpolated FIR, filter signal 508. These fixed taps 502 are not adaptive and may not be changed to respond to operating condition changes.

The other taps 504 of this FIR filter (indicated as the peaks of the FIR filter signal 508) are not indicated with X's because they would be fully adaptive and unconstrained. An ideal equalizer signal 506 is shown superimposed over the various taps 502, 504 as the smooth, interpolated line which intersects with the various FIR taps 502, 504.

This FIR filter may provide a stable system design and still allow the FIR filter to adjust to some changes in operating conditions. The disadvantage of designing the FIR filter in this way is that four of the 17 FIR taps are fixed and thus the adaptability of the FIR filter is limited.

Of course, in various implementations, more or less FIR taps may be fixed as would be understood by one of skill in the art, and the fixed FIR taps may be positioned separated from one another, at extreme ends of the FIR filter signal, in the middle of the FIR filter signal (as shown), or arranged in any other way conceivable by one of skill in the art.

Figure 6:
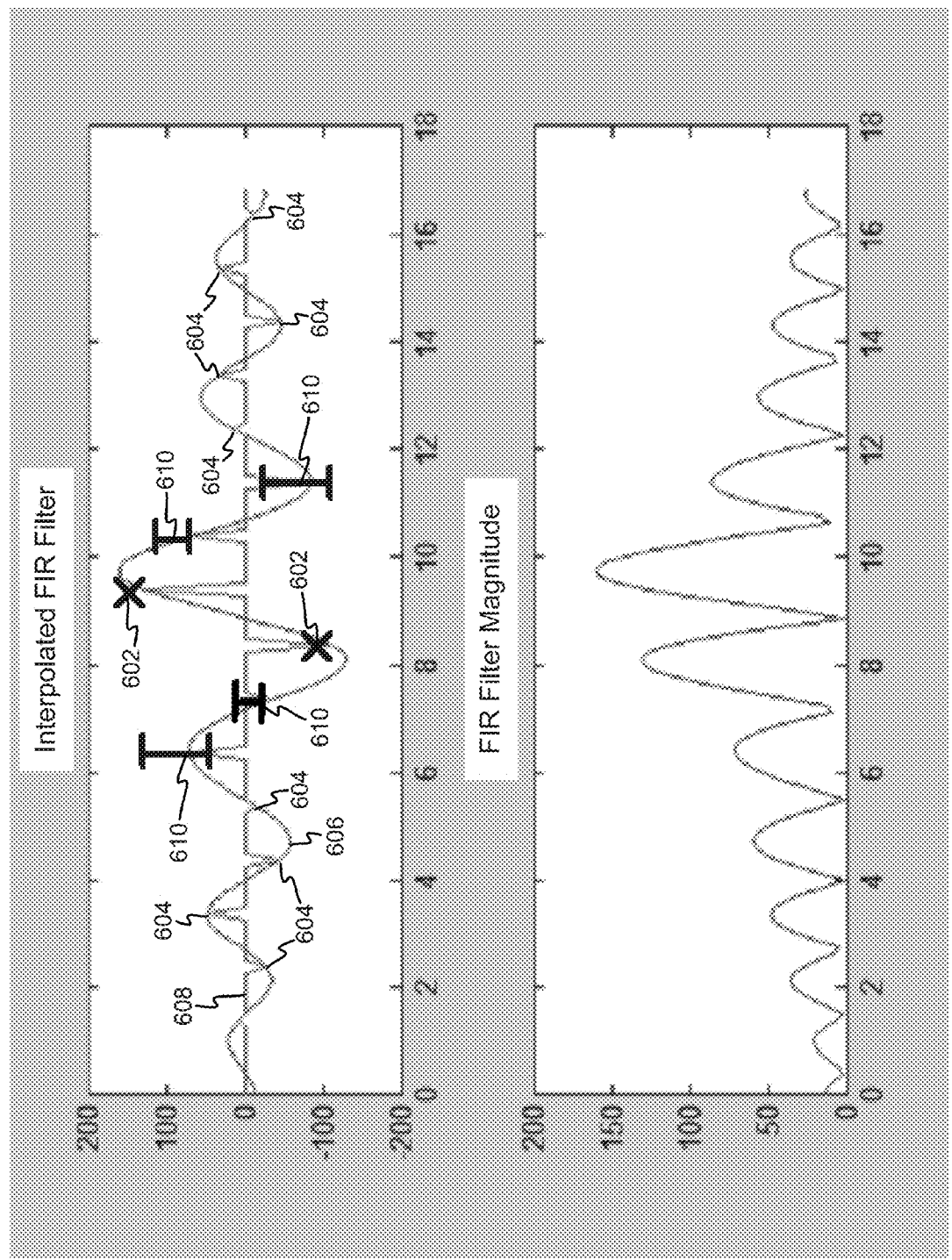
FIG. 6 shows an interpolated FIR filter signal, in one example.

Now referring to FIG. 6, an interpolated FIR filter signal 608 is used to describe one embodiment. In this embodiment, one or more of the FIR filter taps are constrained to a range, instead of being fully adaptive or being fixed. These range-constrained FIR filter taps 610 are indicated by the connected upper and lower limits (they appear as I's). In addition, none, one, or more of the FIR filter taps may be fully adaptive, and none, one, or more of the FIR filter taps 602 may be fixed to individual predetermined values. This allows the one or more range-constrained FIR filter taps 610 to be constrained by an upper limit and a lower limit while still being adaptable to changing operating conditions. As shown, FIR filter taps 6, 7, 10, and 11 are constrained within range limits indicated by the black vertical bars. In reality, all FIR filter taps 602, 604, 610 are constrained. FIR filter taps 8 and 9 are constrained to one value. FIR filter taps 0-5 and FIR filter taps 12-16 are constrained to the full limits of the design.

An ideal equalizer signal 606 is shown superimposed over the various taps 602, 604, 610 as the smooth, interpolated line which intersects with the various FIR taps 602, 604, 610.

Although certain FIR filter taps are shown as being either fixed, range-constrained, or fully adaptable, any number and any selection of FIR filter taps may be fixed, any number and any selection of FIR filter taps may be range-constrained, and any number and any selection of FIR filter taps may be fully adaptable.

For the FIR filter taps 602, 610, any number of bits may be used to represent the magnitude of the fixed taps and/or the range of the range-constrained taps 610. For example, when each FIR filter tap is represented by an 8-bit value, the range for each tap may be from −128 to +127, providing for 256 possible values, or some variation thereof. In another example, when each FIR filter tap is represented by a 6-bit value, the range for each tap may be from −32 to +31, providing for 64 possible values, or some variation thereof. The values may be evenly divided along the total possible values based on the LMS algorithm, as would be understood by one of skill in the art.

In one particular embodiment, a magnetic tape drive may comprise a processor and logic integrated with and/or executable by the processor. The processor may be any suitable processor known in the art, and may be implemented in hardware, software, or a combination thereof. The logic that is executable by the processor may be used for a variety of functions. In one embodiment, the logic may be configured to receive data from an ADC in a read channel and individually determine, for each of one or more range-constrained FIR filter taps configured for use in a FIR filter of the read channel, a predetermined range of values suitable for controlling an equalizer response. The logic may also be configured to individually set, for each of the one or more range-constrained FIR filter taps, a predetermined range of values suitable for controlling the equalizer response. Each of the one or more range-constrained FIR filter taps are individually adaptive within its predetermined range of values based on current operating conditions. The logic may also be configured to individually select, for each of the one or more range-constrained FIR filter taps, a value within its predetermined range prior to passing the data through the equalizer, with the value being selected to optimally control the equalizer response based on current operating conditions and in relation to any other range-constrained FIR filter taps. In addition, the logic may be configured to individually determine, for each of one or more fixed FIR filter taps, a static value which does not change, with the static value being determined to optimally control the equalizer response based on results obtained from an initial equalizer. The logic may also be configured to set each of the one or more fixed FIR filter taps to its static value prior to passing the data through the equalizer and to pass the data through the equalizer comprising the FIR filter to obtain equalized data. The FIR filter may comprise from 9 to 35 FIR filter taps (such as 17), from 1 to 13 range-constrained FIR filter taps (such as 4), and from 1 to 13 fixed FIR filter taps (such as 2), in various embodiments.

Furthermore, in another embodiment, all FIR filter taps which are not fixed or range-constrained are fully adaptive FIR filter taps configured to adapt to current operating conditions without constraint. In this embodiment, the logic is further configured to adjust a value for each of the fully adaptive FIR filter taps based on current operating conditions prior to passing the data through the equalizer.

Figure 7:
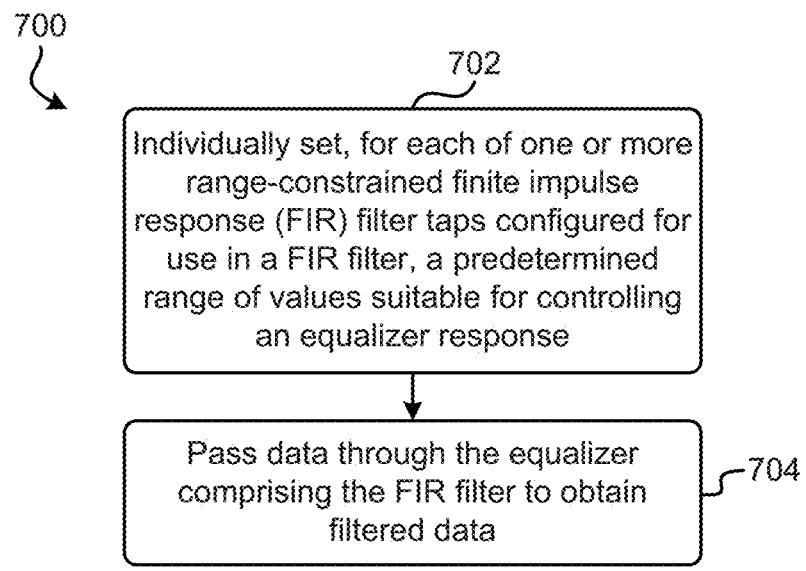
FIG. 7 is a flowchart of a method according to one embodiment.

Now referring to FIG. 7, a flowchart of a method 700 for processing data is shown according to one embodiment. The method 700 may be performed in accordance with the present invention in any of the environments depicted in FIGS. 1A-6, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by a magnetic tape drive or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a switching ASIC, a field programmable gate array (FPGA), etc., combinations thereof, or any other suitable computing device known in the art.

As shown in FIG. 7, method 700 may initiate with operation 702, where, for each of one or more range-constrained FIR filter taps configured for use in a FIR filter, a predetermined range of values is set suitable for controlling an equalizer response. Any method known for setting the range-constrained FIR filter taps may be used, such as by setting a bit sequence or string (when the FIR filter tap is based on a number of bits, such as an 8-bit FIR filter tap), programming a FIR filter curve, etc.

Each of the one or more range-constrained FIR filter taps are individually adaptive within its predetermined range of values, so that each range-constrained FIR filter tap may be optimally set in response to current operating conditions (conditions of reading the data from a magnetic medium, temperature, skew, track alignment, errors, etc.) that are detected just prior to receiving the data.

In several embodiments, the FIR filter may comprise from 9 to 35 FIR filter taps, such as 17 FIR filter taps in one approach. According to one approach, the FIR filter may comprise anywhere from 1 to 13 range-constrained FIR filter taps, such as 3, 4, 5, etc.

In operation 704, data is passed through the equalizer comprising the FIR filter to obtain equalized data. The data may be read from a magnetic storage medium, such as a magnetic tape, hard disk, etc., and may be processed prior to being passed through the equalizer, and/or may be further processed after leaving the equalizer, as would be understood by one of skill in the art.

For example, in one embodiment, method 700 may further comprise one or more of: receiving the data from an ADC, passing the equalized data from the equalizer through a mid-linear filter to obtain linear data, passing the linear data from an output of the mid-linear filter through a sample interpolation module to obtain interpolated data, and/or passing the interpolated data from an output from the sample interpolation module through a gain control module. Of course, other processing may be performed on the data that is not specifically described herein.

In another embodiment, method 700 may further comprise individually determining, for each of the one or more range-constrained FIR filter taps, the predetermined range of values suitable for controlling the equalizer response. Any technique known in the art may be used for making this determination, such as trial-and-error, selecting based on historical response data, using an LMS algorithm or some other suitable algorithm for calculating appropriate ranges which provide the greatest likelihood of successfully decoding/detecting the data successfully, etc.

In one embodiment, a conventional method may be used to individually determine an optimum single value for one or more of the taps (each tap may have a different optimum value as shown in FIGS. 5-6), and then a range for these one or more taps may be determined based on the optimum single value thereof, such as by determining the range to be +1% and −1% from the optimum value, ±5%, ±10%, +5% and −10%, or some other range determined based on the optimum determined value as would be understood by one of skill in the art. In another embodiment, the range may be related to the optimum determined value by a certain set amount such as a number: 1,5, 10, 20, etc., instead of a percentage of the optimum value. In another embodiment, a function may be applied to the optimum value in order to determine the range associated with the particular tap.

Referring again to FIG. 7, according to another embodiment, method 700 may further comprise individually selecting, for each of the one or more range-constrained FIR filter taps, a value within its predetermined range prior to passing the data through the equalizer. In this way, an optimal value may be selected based on current operating conditions (or those which are detected just prior to receiving/processing the data) in order to maintain stability in the equalizer calculations and to still provide for adaptability to changing read conditions, e.g., the value is selected to optimally control the equalizer response based on current operating conditions and in relation to any other range-constrained FIR filter taps, as all FIR filter taps work together to provide the equalizer response.

According to yet another embodiment, method 700 may further comprise individually determining, for each of one or more fixed FIR filter taps, a static value which does not change, and setting each of the one or more fixed FIR filter taps to its static value prior to passing the data through the equalizer. The static value is determined to optimally control the equalizer response based on results obtained from an initial equalizer, but these static values are not determined during a read operation, and therefore current operating conditions are not taken into account in these static values.

In this embodiment, the FIR filter may comprise anywhere from 1 to 13 fixed FIR filter taps, such as 1, 2, 3, 4, etc., and from 1 to 13 range-constrained FIR filter taps, such as 5, 6, 7, 8 etc.

According to another embodiment, all FIR filter taps which are not fixed or range-constrained are fully adaptive FIR filter taps configured to adapt to current operating conditions without constraint. In this embodiment, method 700 may further include adjusting a value for each of the one or more range-constrained FIR filter tap within its designated range and adjusting a value for each of the fully adaptive FIR filter taps based on current operating conditions prior to passing the data through the equalizer. In this way, each of the adaptive FIR filter taps, those unconstrained and those range-constrained, may be optimized prior to running the equalizer calculations to provide optimal results.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (RDM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block-diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an ASIC, a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a CPU, an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer sendee on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system for processing data, the system comprising a processor and logic integrated with and/or executable by the processor, the logic being configured to:
   individually set, for each of one or more range-constrained finite impulse response (FIR) filter taps configured for use in a FIR filter, a predetermined range of values suitable for controlling an equalizer response;
   individually determine, for each of one or more fixed FIR filter taps configured for use in the FIR filter, a static value which does not change, wherein the static value is determined to optimally control the equalizer response based on results obtained from an initial equalizer;
   set each of the one or more fixed FIR filter taps configured for use in the FIR filter to its static value; and
   pass data through the equalizer comprising the FIR filter to obtain equalized data,
   wherein each of the one or more range-constrained FIR filter taps are individually adaptive within its predetermined range of values.

2. The system as recited in claim 1, wherein the logic is further configured to:
   individually determine, for each of the one or more range-constrained FIR filter taps, the predetermined range of values suitable for controlling the equalizer response,
   wherein the FIR filter comprises from 9 to 35 FIR filter taps.

3. The system as recited in claim 2, wherein the FIR filter comprises from 1 to 13 range-constrained FIR filter taps.

4. The system as recited in claim 1, wherein the logic is further configured to:
   individually select, for each of the one or more range-constrained FIR filter taps, a value within its predetermined range prior to passing the data through the equalizer,
   wherein the value is selected to optimally control the equalizer response based on current operating conditions and in relation to any other range-constrained FIR filter taps.

5. The system as recited in claim 1, wherein the FIR filter comprises from 9 to 35 FIR filter taps.

6. The system as recited in claim 5, wherein the FIR filter comprises from 1 to 13 fixed FIR filter taps and from 1 to 13 range-constrained FIR filter taps.

7. The system as recited in claim 6, wherein all FIR filter taps which are not fixed or range-constrained are fully adaptive FIR filter taps configured to adapt to current operating conditions without constraint.

8. The system as recited in claim 7, wherein the logic is further configured to:
   adjust a value for each of the one or more range-constrained FIR filter tap within its designated range and adjust a value for each of the fully adaptive FIR filter taps based on current operating conditions prior to passing the data through the equalizer.

9. The system as recited in claim 1, wherein the logic is further configured to:
   receive the data from an analog-to-digital converter (ADC);
   pass the equalized data from the equalizer through a mid-linear filter to obtain linear data;
   pass the linear data from an output of the mid-linear filter through a sample interpolation module to obtain interpolated data; and
   pass the interpolated data from an output from the sample interpolation module through a gain control module.

10. A method for processing data in a read channel, the method comprising:
    individually setting, for each of one or more range-constrained finite impulse response (FIR) filter taps configured for use in a FIR filter, a predetermined range of values suitable for controlling an equalizer response;
    individually determining, for each of one or more fixed FIR filter taps configured for use in the FIR filter, a static value which does not change, wherein the static value is determined to optimally control the equalizer response based on results obtained from an initial equalizer;
    setting each of the one or more fixed FIR filter taps to its static value prior to passing data through the equalizer; and
    passing data through the equalizer comprising the FIR filter to obtain equalized data,
    wherein each of the one or more range-constrained FIR filter taps are individually adaptive within its predetermined range of values,
    wherein the FIR filter comprises the one or more fixed FIR filter taps and one or more fully adaptive FIR filter taps configured to adapt to current operating conditions without constraint, wherein the FIR filter comprises for 9 to 35 FIR filter taps, and wherein the data is read from a magnetic storage medium.

11. The method as recited in claim 10, further comprising:

individually determining, for each of the one or more range-constrained FIR filter taps, the predetermined range of values suitable for controlling the equalizer response.

12. The method as recited in claim 11, wherein the FIR filter comprises from 1 to 13 range-constrained FIR filter taps.

13. The method as recited in claim 10, further comprising:

individually selecting, for each of the one or more range-constrained FIR filter taps, a value within its predetermined range prior to passing the data through the equalizer, wherein the value is selected to optimally control the equalizer response based on current operating conditions and in relation to any other range-constrained FIR filter taps.

14. The method as recited in claim 10, wherein the FIR filter comprises from 1 to 13 fixed FIR filter taps and from 1 to 13 range-constrained FIR filter taps.

15. The method as recited in claim 14, further comprising:

adjusting a value for each of the one or more range-constrained FIR filter tap within its designated range based on current operating conditions prior to passing the data through the equalizer.

16. The method as recited in claim 14, further comprising:

adjusting a value for each of the fully adaptive FIR filter taps based on the current operating conditions prior to passing the data through the equalizer.

17. The method as recited in claim 10, further comprising:

receiving the data from an analog-to-digital converter (ADC);

passing the equalized data from the equalizer through a mid-linear filter to obtain linear data;

passing the linear data from an output of the mid-linear filter through a sample interpolation module to obtain interpolated data; and passing the interpolated data from an output from the sample interpolation module through a gain control module.

18. A magnetic tape drive, comprising a processor and logic integrated with and/or executable by the processor, the logic being configured to:

receive data from an analog-to-digital converter (ADC) in a read channel;

individually determine, for each of one or more range-constrained finite impulse response (FIR) filter taps configured for use in a FIR filter of the read channel, a predetermined range of values suitable for controlling an equalizer response;

individually set, for each of the one or more range-constrained FIR filter taps, a predetermined range of values suitable for controlling the equalizer response, wherein each of the one or more range-constrained FIR filter taps are individually adaptive within its predetermined range of values based on current operating conditions;

individually select, for each of the one or more range-constrained FIR filter taps, a value within its predetermined range prior to passing the data through the equalizer, wherein the value is selected to optimally control the equalizer response based on current operating conditions and in relation to any other range-constrained FIR filter taps;

individually determine, for each of one or more fixed FIR filter taps, a static value which does not change, wherein the static value is determined to optimally control the equalizer response based on results obtained from an initial equalizer; and set each of the one or more fixed FIR filter taps to its static value prior to passing the data through the equalizer; and pass the data through the equalizer comprising the FIR filter to obtain equalized data, wherein the FIR filter comprises from 9 to 35 FIR filter taps, from 1 to 13 range-constrained FIR filter taps, and from 1 to 13 fixed FIR filter taps.

19. The magnetic tape drive as recited in claim 18, wherein all FIR filter taps which are not fixed or range-constrained are fully adaptive FIR filter taps configured to adapt to current operating conditions without constraint, and wherein the logic is further configured to:

adjust a value for each of the fully adaptive FIR filter taps based on current operating conditions prior to passing the data through the equalizer.

* * * * *